May 12, 1925.
D. C. BRYAN
TILTABLE BED, TRUCK, AND SHIFTABLE CRANE
Filed Sept. 8, 1922
1,537,457
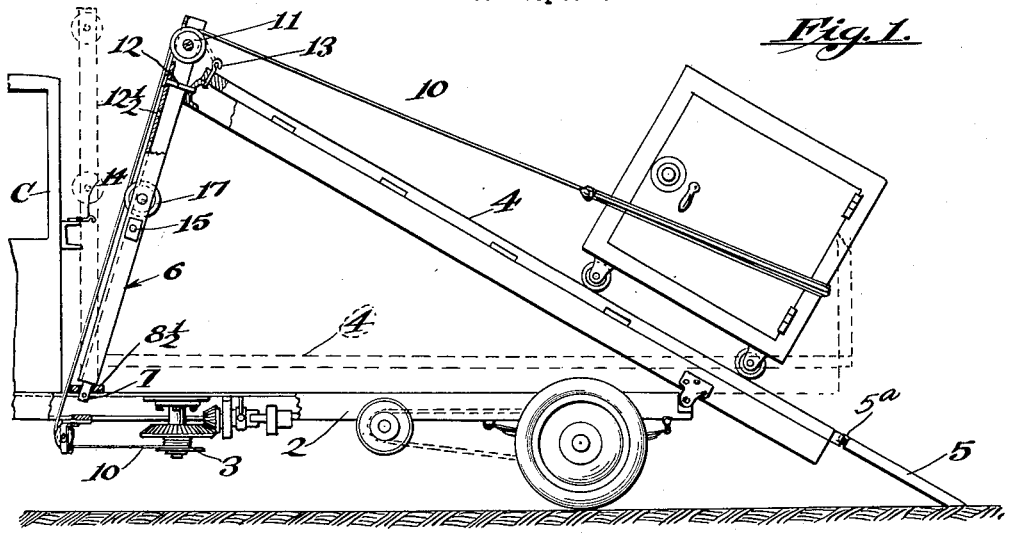
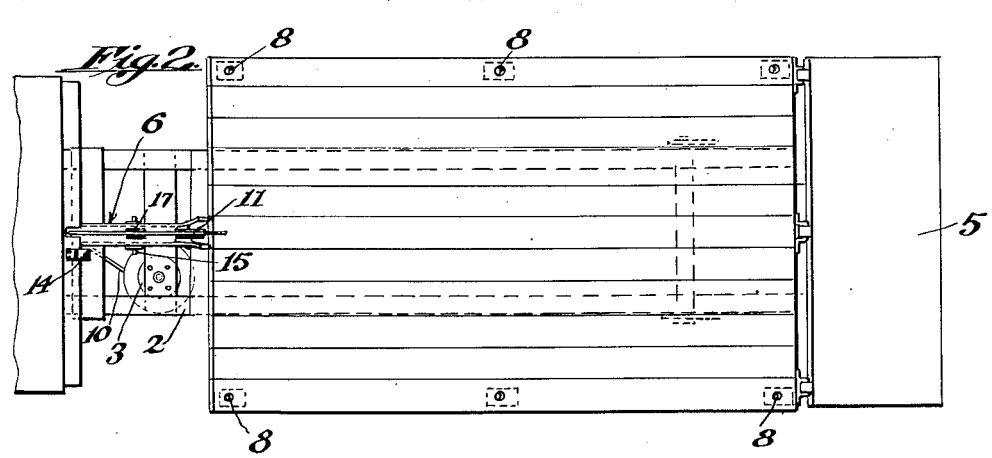
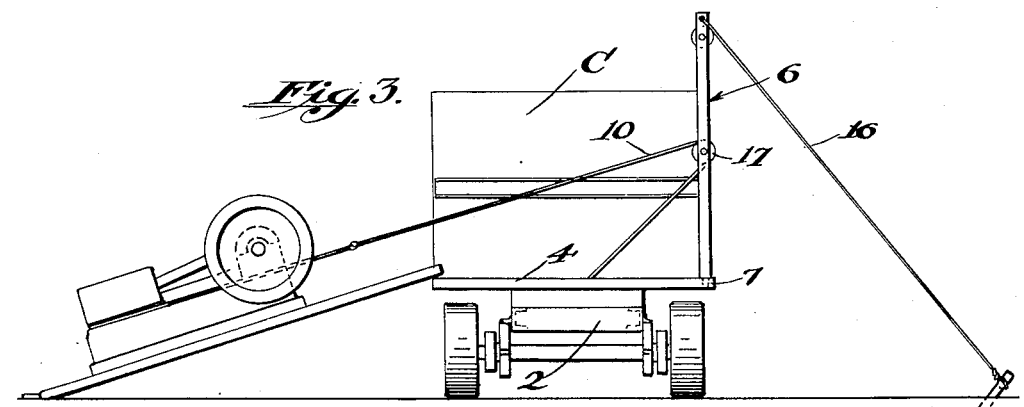
Inventor
Don C. Bryan
By Hazard and Miller
Attorneys Patented May 12, 1925.

1,537,457

UNITED STATES PATENT OFFICE.

DON C. BRYAN, OF HUNTINGTON BEACH, CALIFORNIA.

TILTABLE BED, TRUCK, AND SHIFTABLE CRANE.

Application filed September 8, 1922. Serial No. 586,866.

*To all whom it may concern:*

Be it known that I, DON C. BRYAN, a citizen of the United States, residing at Huntington Beach, in the county of Orange and State of California, have invented new and useful Improvements in a Tiltable Bed, Truck, and Shiftable Crane, of which the following is a specification.

This invention relates to vehicle structures and specially to tiltable beds for motor trucks.

The present invention is an improvement in trucks of the general form disclosed in my application Serial No. 561,541, filed May 16, 1922, Patent No. 1,481,681, dated Jan. 22, 1924 and in which there is shown a power driven rope drum operated by the truck motor.

It is an object of the present invention to provide a truck bed which may be utilized as a skid-way onto and from which to haul heavy loads. It is also an object to provide a truck bed which can be readily adjusted to suitable angles to facilitate loading of heavy objects and also to facilitate the ready discharge of various loads, such as building materials and road building materials and for various other purposes. It is an object to provide a tiltable truck bed having an extension adapted to be lowered in an inclined position to complete the skid-way which is formed by the upwardly inclined truck bed and thus to facilitate moving a heavy load from the ground level up the inclined skid-way to the desired position. It is an object also to provide a bed extension that may be utilized as a tail or end gate.

Another object is to provide a substantial stanchion that may be readily shifted from one position to another and which has the function of serving as a part of the bed tilting means when in one arrangement and may be utilized as a crane stanchion to facilitate the taking of a load onto or off of the bed.

Other objects and advantages will be made manifest in the following specification of an embodiment of the invention illustrated in the accompanying drawings, wherein Figure 1 is a side elevation of a truck having the improved tiltable bed and means for lifting the same, and showing the lifting means adapted for working a load or heavy object onto the tilted bed; the latter being shown in horizontal position in dotted lines.

Fig. 2 is a plan of the truck and bed shown in Fig. 1.

Fig. 3 is a rear end elevation of the truck showing the stanchion arranged in a position to serve as a crane post.

In the present disclosure a portion of the chassis 2 of a motor truck is shown as provided with a motor driven winch or rope drum 3 which is more fully and specifically described in the above mentioned patent.

In the present case the truck chassis is provided with a tiltable skid-way or bed 4 of any suitable construction, the rear end of which overhangs the chassis somewhat and allows the bed to be tilted up to a suitable angle before hitting the roadway and thus provides for the gravitation of dumping of some characters of loads that may be carried on the bed floor. The tail end of the bed is provided with an extension or end gate part 5 hingedly connected as at 5ª to the end of the bed, and this extension is adapted to be lowered to bridge the space between the downwardly extending end of the upwardly tilted bed and the ground, thereby providing for a substantial support over which may be run or worked a load to be positioned on the bed.

A feature of the invention consists of a substantial post or stanchion 6, the lower end of which is provided with a stout pin 7 adapted to be readily inserted in a plurality of floor sockets 8 in the truck bed or in a floor socket 8½ provided just behind the cab C of the truck. The socket 8½ is preferably centrally arranged between the side beams of the chassis, and when in such position, there is adapted to be run up over the stanchion a section of cable 10, one end of which is attached to the winding drum 3 and the other end of which may pass over a top sheave 11 at the head of the stanchion. The stanchion is adapted to swing from a vertical position to the rearward inclined position shown in Fig. 1 in compensation for the angular movement of the truck bed 4, which is detachably connected as by a pin 12 when it is elevated to the desired angle by the operation of the winding drum 3 to which the cable 10 is connected, and while the cable is attached as at a hook 13 to the forward end of the bed 4. The stanchion is provided with a series of apertures 12½ to receive the temporary fastening device 12.

When the bed has been thus elevated and pinned to the head of the stanchion, the cable 10 may be detached from the hook 13 and extend sufficiently to be attached to the load or object that it is desired to draw onto the truck bed 4. As shown in Fig. 1, the apparatus is being used for pulling a safe onto the inclined truck bed 4 from the roadway or level on which the wheels of the truck rest. It is understood that the load may be drawn onto the truck bed while this is either in a horizontal or in any angular position.

The stanchion is adapted to be fastened in upright position as by means of a hook 14 adapted to engage a complementary part 15 provided on the stanchion 6.

The stanchion is adapted to be bodily shifted from the elevating position shown in Figs. 1 and 2 to other positions on the truck bed as is shown in Fig. 4 where the stanchion is set up on one of the sockets 8 and is then guyed as by a guy line 16 to support its upper end. The haul cable 10 is then passed around an intermediate sheave 17 provided on the stanchion and may be extended from the sheave to grapple the load to be drawn onto the truck bed, as for instance over a longitudinal side edge of the bed.

From the above it will be seen that I have provided simple and practicable means for elevating a truck bed, and which means is capable of being utilized as well as a crane like structure conveniently arranged at different positions on the truck to facilitate the loading and unloading of the same.

Further embodiments, modifications and changes may be resorted to within the spirit of the invention as here claimed.

What is claimed is:

1. A motor truck having means forming a vertical floor socket at the transverse center and behind the cab, a tiltable bed upon the motor truck behind the floor socket, a stanchion having a pin fitting in the socket, a pulley at the upper end of the stanchion, cable winding means operated by the truck motor, a cable connected to the cable winding means and adapted to run over the pulley, a hook upon the tiltable bed to which the cable may be attached so that by operating the winding means the forward end of the tiltable bed will be raised, and means for attaching the forward end of the tiltable bed to the stanchion to hold the bed in its elevated position.

2. A motor truck having a frame, a motor and a driven winding means, means forming a vertical socket upon the frame at its transverse center and near its forward end, a tiltable bed mounted upon the frame, and pivotally connected at the rear end of the frame, means forming vertical sockets along the sides of the tiltable bed, a stanchion having a pin adapted to be inserted in any desired one of the sockets, pulleys upon the stanchion, a guide pulley upon the frame, and a cable connected to the winding means and adapted to run over the guide pulley and over the pulleys of the stanchion.

In testimony whereof I have signed my name to this specification.

DON C. BRYAN.